US012620032B2

(12) United States Patent
Lim

(10) Patent No.: US 12,620,032 B2
(45) Date of Patent: *May 5, 2026

(54) DYNAMICALLY-GENERATED ELECTRONIC DATABASE FOR PORTFOLIO SELECTION

(71) Applicant: Kim Hwa Lim, Penang (MY)

(72) Inventor: Kim Hwa Lim, Penang (MY)

( * ) Notice: Subject to any disclaimer, the term of this patent is extended or adjusted under 35 U.S.C. 154(b) by 0 days.

This patent is subject to a terminal disclaimer.

(21) Appl. No.: 18/774,911

(22) Filed: Jul. 16, 2024

(65) Prior Publication Data

US 2024/0412288 A1 Dec. 12, 2024

Related U.S. Application Data

(63) Continuation-in-part of application No. 17/585,445, filed on Jan. 26, 2022, now Pat. No. 12,039,604, (Continued)

(30) Foreign Application Priority Data

May 8, 2017 (MY) ............................... 2017701611

(51) Int. Cl.
G06Q 40/06 (2012.01)
G06Q 40/04 (2012.01)

(52) U.S. Cl.
CPC ......... G06Q 40/0631 (2025.08); G06Q 40/04 (2013.01); G06Q 40/0421 (2025.08); G06Q 40/06 (2013.01)

(58) Field of Classification Search
CPC ............................... G06Q 40/04; G06Q 40/06
See application file for complete search history.

(56) References Cited

U.S. PATENT DOCUMENTS

2006/0047590 A1 3/2006 Anderson et al.
2019/0180375 A1 6/2019 Huang et al.

FOREIGN PATENT DOCUMENTS

CN 101501720 A 8/2009
CN 107832897 A 3/2018
(Continued)

OTHER PUBLICATIONS

Written Opinion of corresponding Singapore patent application No. 10201912696X mailed on Mar. 7, 2025.
(Continued)

*Primary Examiner* — Lindsay M Maguire
(74) *Attorney, Agent, or Firm* — IDEA Intellectual Limited; Sam T. Yip

(57) ABSTRACT

A system for creating a financial instrument selection, sharing the selection, and executing trade instructions thereof: a selector engine for creating selection parameters according to a statistical model for weighting desirability of financial instruments combined with entered user selection preferences or objectives for financial instruments, creating investment portfolios of financial instruments based on the selection parameters, and converting the investment portfolios data to output data representing trade instructions of financial instruments; a deep learning decision engine providing predicative input data and an investment sharing and democratization and portfolio monitoring module providing peer investment portfolio shared data input to the selector engine; and an execution platform for executing the trade instructions, the execution platform including electronic selection limiters to prevent execution of specific trades based on electronic flags computed from electronic checks relating to the amounts and types of the trades.

10 Claims, 13 Drawing Sheets

Related U.S. Application Data which is a continuation-in-part of application No. 16/611,860, filed as application No. PCT/SG2017/050352 on Jul. 13, 2017, now abandoned.

(56) References Cited

FOREIGN PATENT DOCUMENTS

| | | |
|---|---|---|
| CN | 110223180 A | 9/2019 |
| WO | 2018208227 A1 | 11/2018 |

OTHER PUBLICATIONS

First Office Action of the corresponding China patent application No. 202080082019.9 mailed on Dec. 28, 2024.

Kit Yan Chan et al., "Deep neural networks in the cloud: Review, applications, challenges and research directions", Neurocomputing, Elsevier, 2023, vol. 545, Article 126327.

Óscar Fernández Vicente et al., "Automated market maker inventory management with deep reinforcement learning", Applied Intelligence, Springer, Jun. 2023, vol. 53, pp. 22249-22266.

Series-Parallel Architecture input $u(t)$ true output
$y_t(t)$

Feed
Forward
Network estimated output
$y^e(t)$

Parallel Architecture input $u(t)$

Feed
Forward
Network estimated output
$y^e(t)$

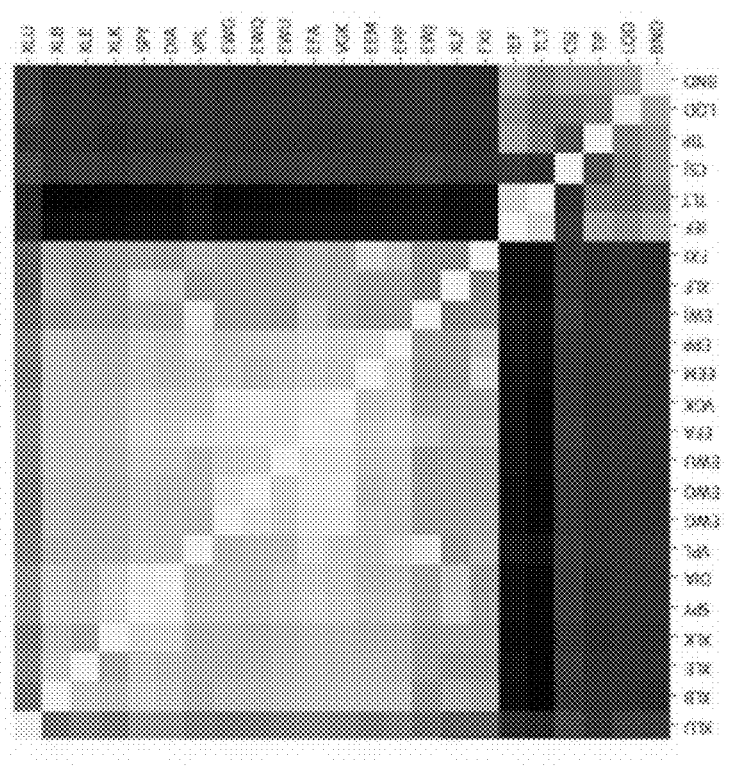
Clustered Correlations
FIG. 12
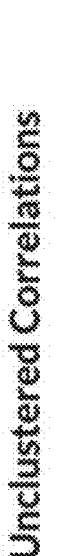
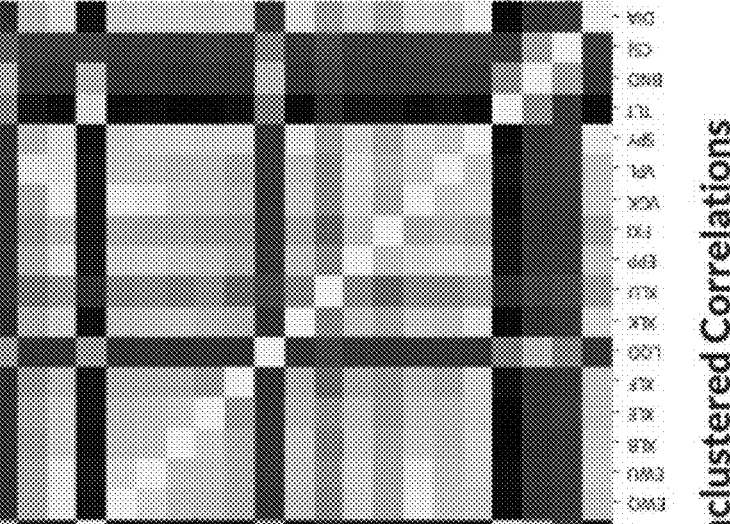
Unclustered Correlations

DYNAMICALLY-GENERATED ELECTRONIC DATABASE FOR PORTFOLIO SELECTION

CROSS-REFERENCE WITH RELATED FIELD

The present application is a continuation-in-part application of U.S. patent application Ser. No. 17/585,445 filed Jan. 26, 2022; which is a continuation-in-part application of U.S. patent application Ser. No. 16/611,860 filed Nov. 8, 2019; the disclosures of which are incorporated by reference in their entirety.

FIELD OF THE INVENTION

The present invention relates generally to improvements in electronic processing systems, particularly, electronic databases used for determining selections from real-time-updated electronic exchanges. The novel electronic database structure is dynamically generated for selection of financial instruments with user specified inputs.

BACKGROUND

Current techniques for achieving financial goals by automatically creating an optimal financial instruments portfolio are limited. Databases may be based solely on various market factors with no mechanism for customization based on various user selection preferences or user needs. Automatic portfolio selection is typically limited to exchange-traded funds (ETFs) in which the financial instruments selected match those of a particular exchange, linking the portfolio performance solely to the performance of that index without a clear link to how to achieve the financial goals.

Alternatively, investors may purchase mutual funds in which a large portfolio management entity selects financial instruments for inclusion based on the portfolio management entity's knowledge and research. These funds do not allow customization of the underlying securities based on individual investor preference such as a desire to support green technology or avoiding financial instruments originating in certain countries. Users are also not able to combine investment funds in a way that directly enables them to achieve their goals optimally.

Individual investors typically do not possess all the information to create an optimal portfolio and to rebalance it consistently in the future. Due to the fact that financial instruments are purchased on a real-time-updated exchange, it is technically impossible for human being to evaluate all of the factors needed to optimize and manage a financial instrument portfolio in real time. As used herein, the term "financial instrument" includes stocks, bonds, contracts related to the purchase of stocks or bonds, packages of capital, currency, funds, or any assets that can be traded by means of a representation on an electronic exchange.

Due to the ever-changing user's financial requirements and the technical problem of being unable to process all the information needed to create and maintain a customized portfolio in real time, there is a need in the art to dynamically create an electronic database that evaluates various variables in real time to enable selection from a real-time electronic exchange based on attributes identified by the dynamically-created electronic database.

SUMMARY OF THE INVENTION

The present invention relates to a system, including an electronic database, and a method for executing a selection from a dynamically-generated electronic database. The database includes a plurality of selection parameters created according to statistical models for weighting desirability of financial instruments combined with user entered selection preferences for financial instruments. Each financial instrument is electronically associated with a dynamic electronic label indicating whether the financial instrument is restricted for selection at least in part based upon user entered selection preferences. The selection parameters are electronically converted by a selector engine to electronic output; the selector engine electronic output can be validated based on previously determined outcome parameters associated with past outcomes for the financial instruments in the electronic output of the selector engine.

A computer processor is configured for executing external selections from a real-time updating external electronic exchange database based on the electronic output of the selector engine, the computer processor including electronic selection limiters to prevent execution of external selections based on electronic flags computed from electronic checks relating to the amount and type of external selections.

BRIEF DESCRIPTION OF THE DRAWINGS

Embodiments of the invention are described in more details hereinafter with reference to the drawings, in which:

FIG. 12 illustrates an exemplary map of un-clustered correlations and its corresponding map of clustered correlations among financial instruments in an investment portfolio in accordance to one embodiment of the present invention;

DETAILED DESCRIPTION

Figure 1:
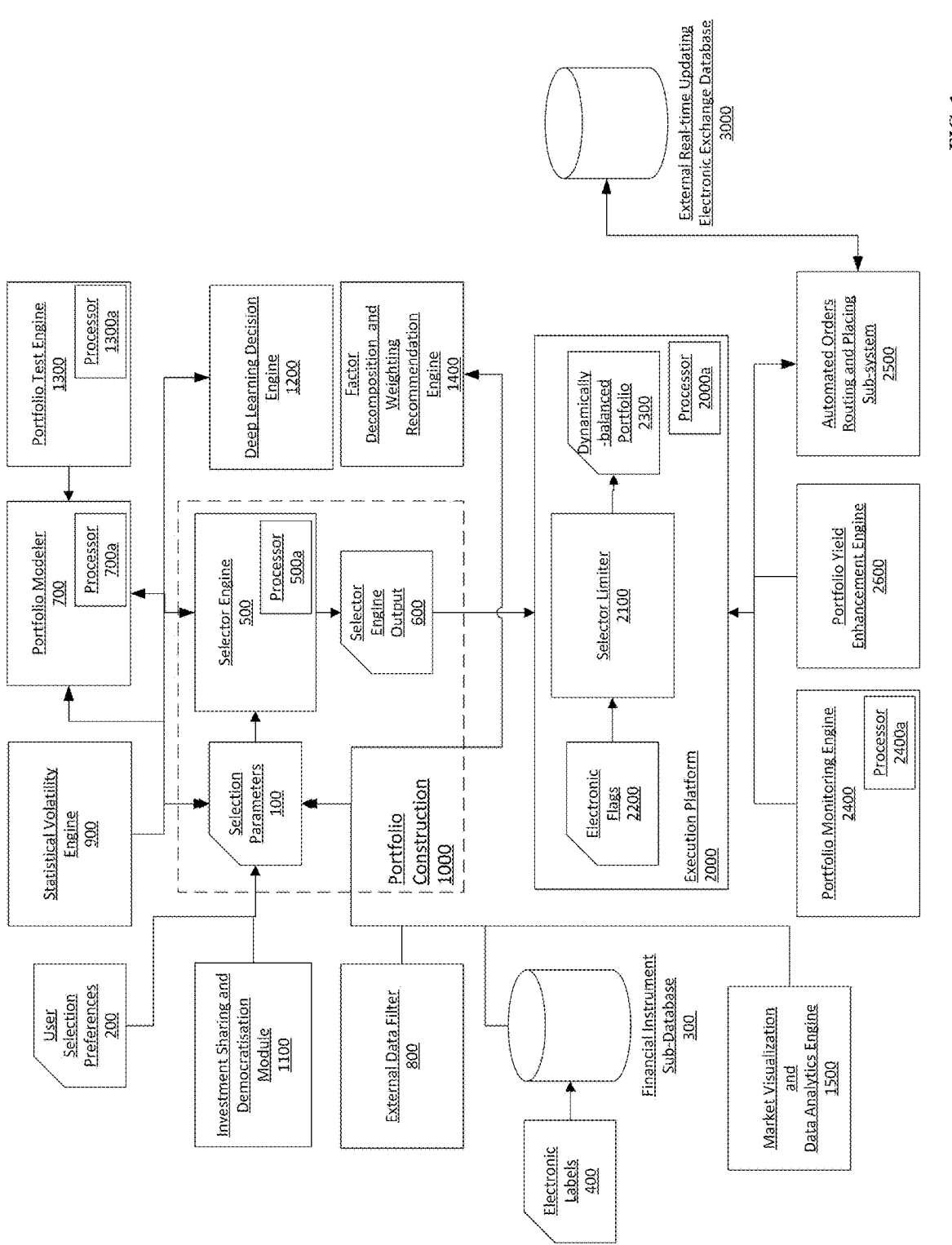
FIG. 1 schematically depicts an electronic processing system including dynamically-created electronic data storage in accordance to one embodiment of the present invention.

In the following description, methods and apparatuses for creating, updating, and making selections from a dynamic electronic database upon which to base financial instrument selection are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

The electronic embodiments disclosed herein may be implemented using specialized computing devices, specifically configured computer processors, or electronic circuitries including but not limited to application specific integrated circuits (ASIC), field programmable gate arrays (FPGA), and other programmable logic devices configured according to the teachings of the present disclosure. Machine instructions being executed in and/or used to configure the specialized computing devices, computer processors, or programmable logic devices to perform the methods according to the embodiments of the present invention can readily be prepared by practitioners skilled in the computer or electronic art based on the teachings of the present disclosure.

All or portions of the electronic embodiments may be executed in one or more specialized computing devices including specifically configured server computers, specifically configured personal computers, specifically configured laptop computers, specifically configured mobile computing devices such as 'smartphones', 'tablet computer' and 'kiosk computer'.

The electronic embodiments include one or more electronic and/or electro-mechanical user interfaces and at least one computer storage media having the machine instructions stored therein, which can be used in the implementation of any of the methods of the present invention. The electronic user interfaces may be using webpages, apps, chatbots, and/or other means of communication and interaction with the user. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

As used herein, the expression "dynamically-created database" relates to a collection of information that is organized so that it can be easily accessed and managed and is updated by various calculated results of various machine instruction modules and while factoring in customizable preference data. The term "database" is used broadly and may include machine instruction storage regions for storing executing machine instructions that act upon the database to dynamically create and store data therein. Thus, the database may reside in various regions of a cluster of electronic memory circuits that include both information and machine instructions for acting upon information.

Turning to the drawings in details, FIG. 1 schematically depicts an overview of a system for executing a selection from a dynamically-generated electronic database. In one embodiment, the selection of financial instruments and various parametric values in the portfolio construction engine 1000 is primarily executed by a selector engine 500, which comprises at least one (a first) processor 500a, based on a plurality of selection parameters 100 and statistical models for weighting desirability of the financial instruments to be included in one or more investment portfolios. Throughout the rest of this document, the term, investment portfolio, means a collection of one or more financial instrument with its respective holding size or amount, position, and future action(s) to be carried out. One input to the selection parameters 100 is user selection preferences 200. Another input to the selection parameters 100 is the data received from a financial instrument sub-database 300 having data on various financial instruments. The financial instrument sub-database 300 is dynamically updated with information from an external exchange database. Each financial instrument is electronically associated with a dynamic electronic label 400 indicating whether the financial instrument is restricted for selection. In this regard, the dynamic electronic label 400 may include a setting that toggles between approved and restricted.

An external data electronic filter 800 may further provide input to the selection parameters 100. The external data electronic filter 800 eliminates noise from external data through electronic text processing, standardization, and electronic pre-computation. A statistical volatility engine 900 may further provide input to the selection parameters 100 by providing data regarding financial instrument volatility. The selection parameters 100 can be set to off-limits to certain financial instruments with an undesirable level of volatility.

The selection parameters 100 are processed by a selector engine 500 to generate an output 600, which may optionally be validated based on simulated performance of the financial instruments using past outcomes ('backtest') as determined by portfolio modeler 700, which comprises at least one (a fourth) processor 700a. The selector engine output 600, which may include data representing one or more trades (trade basket), is then communicated to an execution platform 2000 for executing the trades with interaction and data exchanges with an external real-time updating electronic exchange database 3000.

Figure 4:
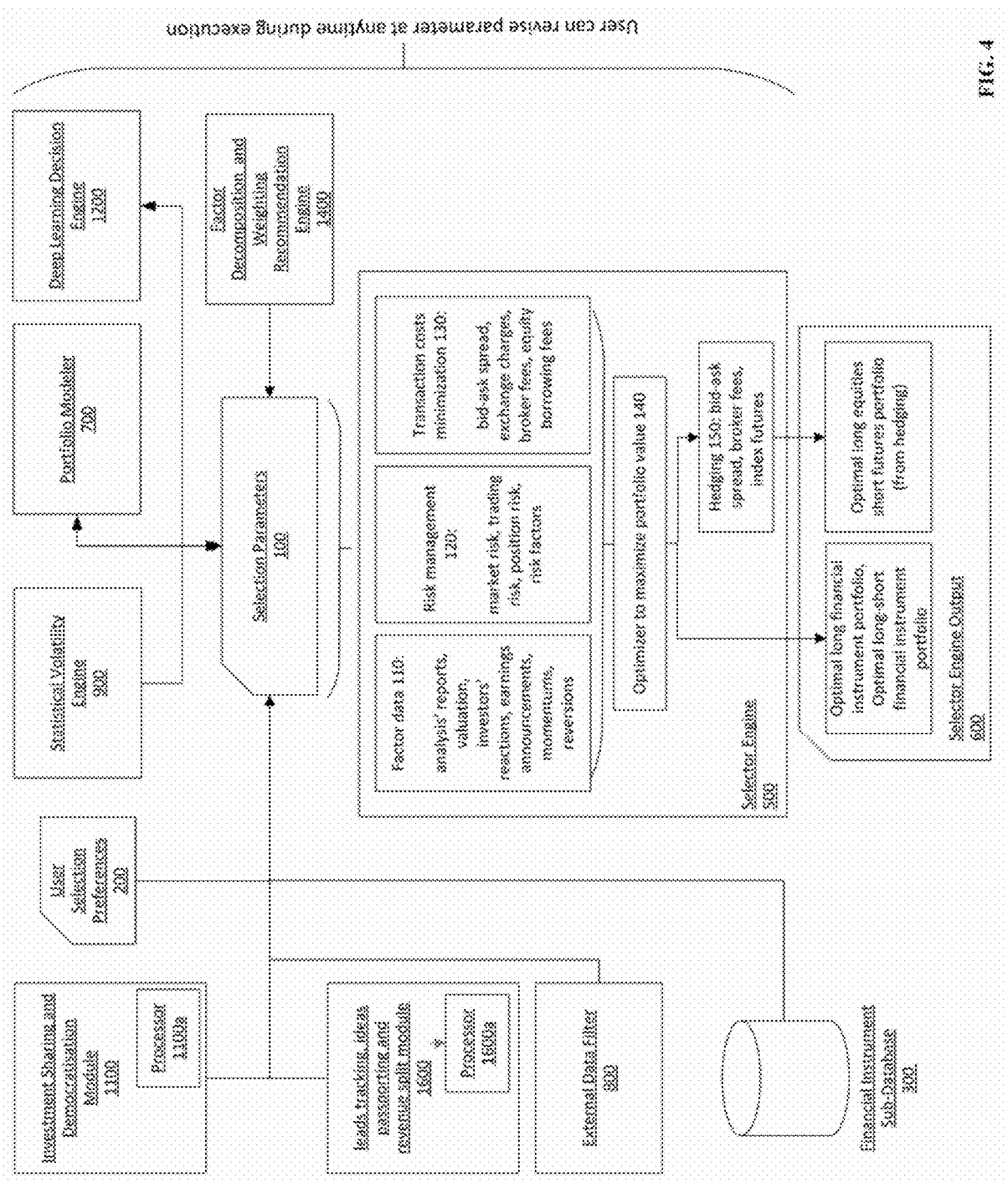
FIG. 4 schematically depicts a portfolio construction engine in the electronic processing system as shown in FIG. 1.

Referring to FIG. 4. In one embodiment, the system further comprises an investment sharing and democratization module 1100, which comprises at least one (a second) processor 1100a and configured to contribute to the selection parameters 100. The investment sharing and democratization module 1100 accesses the investment portfolio data of peer users of the system, and provides a user interface that allows each user (e.g., equity investor), who chooses to be identified as a "creator", to specify whether to share freely or license her investment portfolio with others or safeguard (keep confidential) a portion or whole of her investment portfolio, and whether to share or license the idea and strategy construction parameters of investment portfolio ("strategy") to another user, which can be a natural person user or an institutional user, wherein the institutional user may be a regulated entity. In other words, when a creator shares or licenses her investment portfolio, or a portion thereof, with others, she is simply allowing the others to view the composition (e.g., the selection of financial instruments and their proportion in the investment portfolio) of her investment portfolio and its changes during the sharing or licensing time period. On the other hand, when a creator shares or licenses her strategy, she is basically disclosing to the others her 'secret formula' in investing.

The investment sharing and democratization module 1100 also allows users to be identified as "followers" and follow one or more other users' investment portfolios and/or strategies as target investment portfolios and/or strategies. The user interface also allows each follower to specify a variable degree of imitation of her own investment portfolio and/or strategy to one or more specific target investment portfolios and/or strategies of the creators. The variable degree of imitation can range from identical tracking or cloning of a target investment portfolio and/or strategy without the follower's intervention to, as example without limitation, tracking of selected individual financial instrument(s), financial instrument(s) of specific type(s), and weighted variants of the target investment portfolio.

Figure 5:
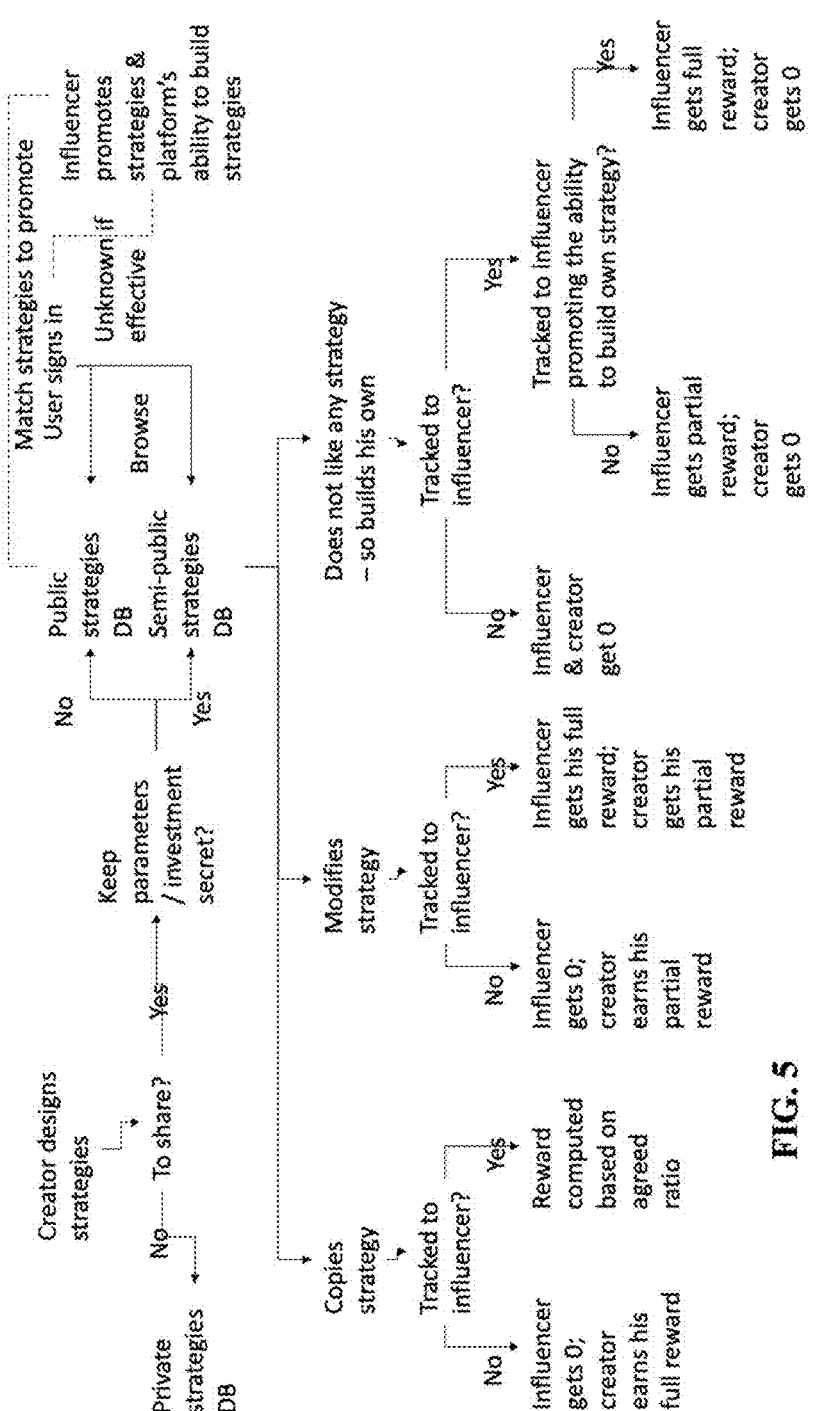
FIG. 5 schematically depicts a decision flow of a process executed by an investment sharing and democratization module in accordance to one embodiment of the present invention.

The module 1100 also captures if an investment portfolio and/or strategy is referred to a follower by another party (identified as an "influencer") who can be a human, an entity, or a machine (e.g., bot). Any subsequent change to the investment portfolio and/or strategy by the creator will be automatically propagated to all her followers. The creator and influencer of the investment portfolio and/or strategy are rewarded monetarily or in other ways. When the followers, influencers, and creators interact, their digital footprints are tracked and updated automatically in real time. Based on the referrals and licensing activities (including the licensing period of an investment portfolio or strategy), the fees (e.g., licensing fees from licensing and following certain investment portfolio and/or strategy that is not shared freely) collected from followers are attributed to the corresponding influencers and creators that have contributed to the fee generation, and technology providers that have provided computing resources to the system (e.g., hosting the system), thus making performance attribution and reward payment transparent. Part of the reward can be optionally shared with a third-party beneficiary ("beneficiary"), like a charity, who has not actively contributed to the fee generation. All of the fees generated may be reconciled and split to each of the stakeholders (creators, influencers, and technology providers) according to an agreed ratio and configured as settings in the investment sharing and democratization module 1100. FIG. 5 schematically depicts a decision flow of the aforesaid process executed by the investment sharing and democratization module 1100.

The investment sharing and democratization module 1100 collects and analyses the data tracked and provide "big data" analytics to the influencers, creators, and licensees via a user interface so that they can track and view the source of their accesses to online assets (e.g., URL clicks), conversions and earnings. The user interface also intelligently suggests and/or matches influencer user to investment portfolios and/or strategies and enables them to find investment portfolios and/or strategies (with the payout details) available to share. The beneficiaries can see the donors, amounts, and their locations. The system also copes with special cases arising from the implementation of this framework. A non-exhaustive list of cases that is provided for illustration purpose only, which include without limitation: cases where investment portfolios and/or strategies promoted by an influencer are not followed by the follower who subsequently copied another creator's investment portfolios and/or strategies, modified another's investment portfolios and/or strategies or even created her own investment portfolios and/or strategies.

In a further embodiment, in addition to the investment sharing and democratization module 1100, the system further comprises a leads tracking, ideas passporting and revenue split module 1600, which comprises at least one (a third) processor. In this embodiment of the present invention, the system is deployed in a software as a service (SaaS)

environment in where one or more organizations (e.g., investment management firms) use the system as institutional users. Each of these institutional users may then have one or more member users and/or entities (e.g., staffs and clients).

Following the aforementioned process of licensing investment portfolios and/or strategies, the leads tracking, ideas passporting and revenue split module 1600 works in concert with the investment sharing and democratization module 1100. Any member user or entity of any institutional user can be a creator of an investment portfolio or strategy. The investment sharing and democratization module 1100 facilitates the sharing of such investment portfolios and strategies among other member users and/or entities of the same institutional user, which may or may not be fee incurring depending on the sharing setting configurations by the technology provider, the institutional user, and/or the creator in the investment sharing and democratization module 1100.

On the other hand, the leads tracking, ideas passporting and revenue split module 1600 allows the creator to license (or "passport") her investment portfolio or strategy to entities, institutions, and persons, which can be referred to as the creator's "licensees", which may or may not be users of the system. Module 1600 further allows the creator to control access to her licensable investment portfolio or strategy, such as whether her investment portfolio or strategy is searchable by others for licensing, which portion of her investment portfolio or strategy is accessible and by which licensees through configuration settings in the module 1600.

Figure 6:
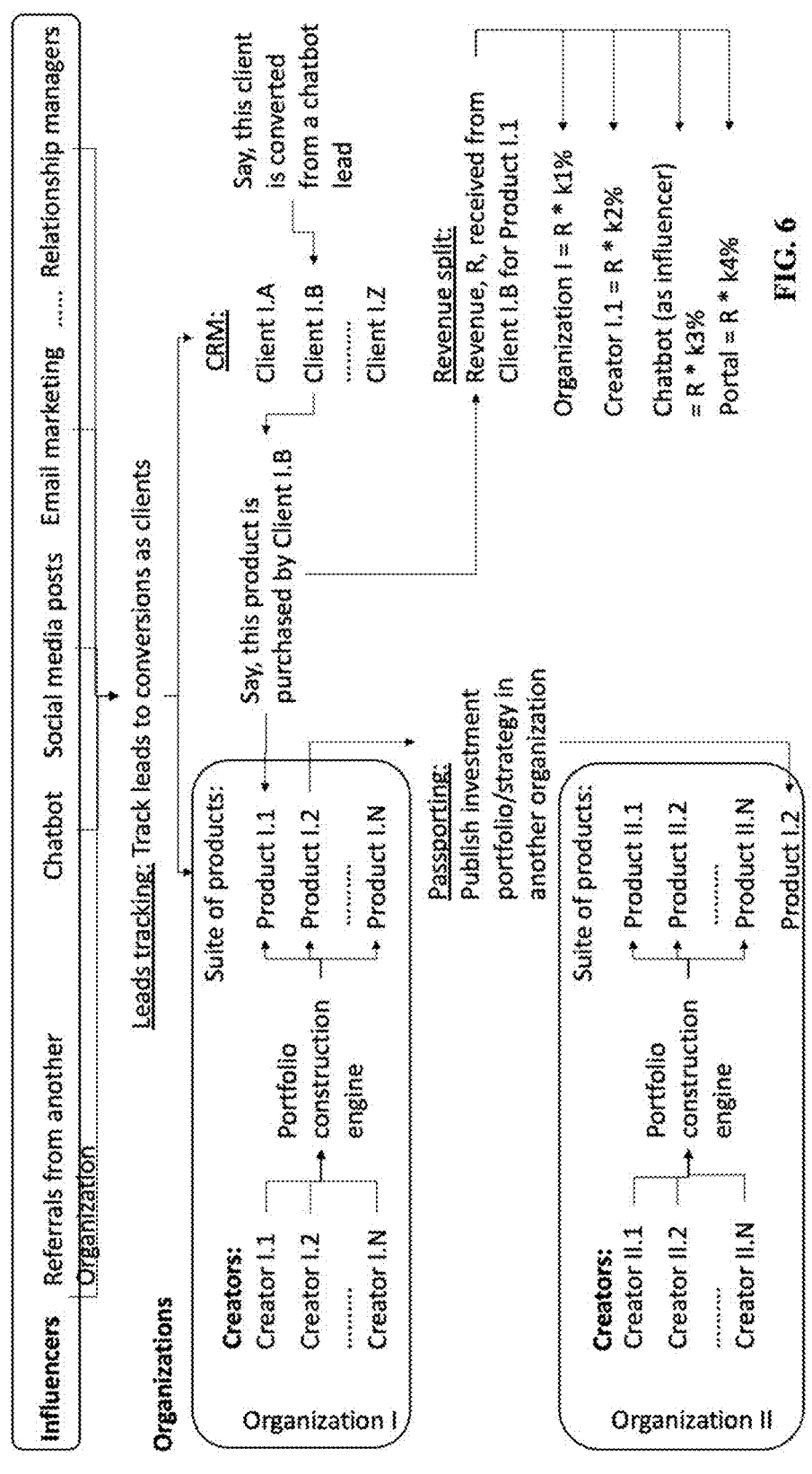
FIG. 6 schematically depicts an exemplary data flow of a process executed by a leads tracking, ideas passporting and revenue split module in accordance to one embodiment of the present invention.

Further, a person, an entity, or a machine (e.g., bot), which may or may not be a user of the system, may act to promote or refer a licensable investment portfolio or strategy to other users (e.g., potential licensees). In this case, this person, entity, or machine is identified as an influencer. The influencer may also refer potential licensees to a creator. Through the use of meta tags and program snippets (e.g., inclusions of them in webpages and emails), the leads tracking, ideas passporting and revenue split module 1600 tracks the leads, such as promotional activities including, but not limited to, targeted electronic communications, online advertisements, social media postings, and click-throughs thereof, and also conversions to licensees (when a potential licensee is turned to a paying licensee of a referred/promoted investment portfolio or strategy). Based on the leads and licensing activities, the leads tracking, ideas passporting and revenue split module 1600 determines and distributes the licensing fees collected from licensees to the corresponding influencers and creators that have contributed to the fee generation, and technology providers that have provided computing resources to the system according to a contributor ratio pre-configured in the module. In illustrating the aforesaid process, FIG. 6 schematically depicts an exemplary data flow executed by the leads tracking, ideas passporting and revenue split module 1600.

Figure 2:
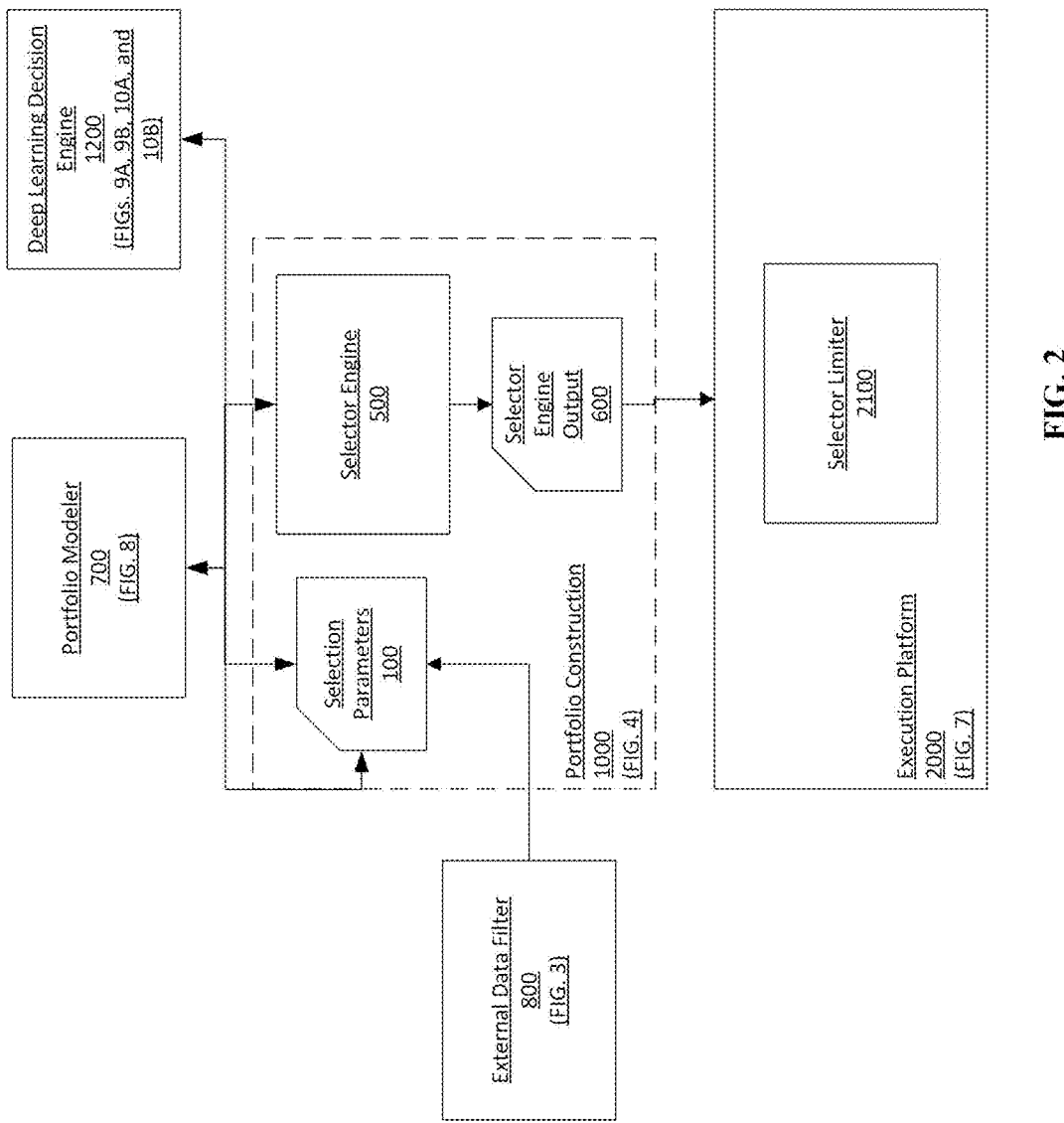
FIG. 2 schematically depicts various details of the electronic processing system as shown in FIG. 1.

FIG. 2 focuses on the interaction of various aspects of FIG. 1 and indicates which subsequent figures include further details concerning these aspects of the invention. As seen in FIG. 2, further operational details of the external data filter 800 is presented in FIG. 3; the portfolio construction engine 1000 in FIG. 4; the process flow of the execution platform 2000 in FIG. 7; the 'backtest' operation process flow of the portfolio modeler platform in FIG. 8; the deep learning decision engine in FIGS. 9A, 9B, 10A, and 10B.

Concerning user selection preferences 200, the present invention can dynamically accept and update user preferences regarding acquisition or divestment of financial instruments, capturing an individual investor's needs, preferences, and investment principles such that an individually bespoke and dynamically balanced portfolio is developed. Examples of user/investor preferences include individual principles (e.g. invest in only clean technology), objectives (e.g. for retirement, property purchase, etc.), risk-reward tolerance (e.g. aggressive growth vs. preservation of capital), capital vs. income needs (e.g. does the investor rely on dividends for income?), savings and spending pattern (e.g. how much to save and spending which can be varied in the future as the user's life progresses), transaction costs incurred (e.g. bid-ask spread paid, broker and exchange fees), portfolio monitoring thresholds (e.g. level of take-profits and cut-loss), rebalancing mode and frequency (e.g. automatic vs. manual and the number of days between rebalancing). As the user preferences may be dynamically changed, the resulting database, investment strategy and portfolio are also dynamically changed.

Figure 3:
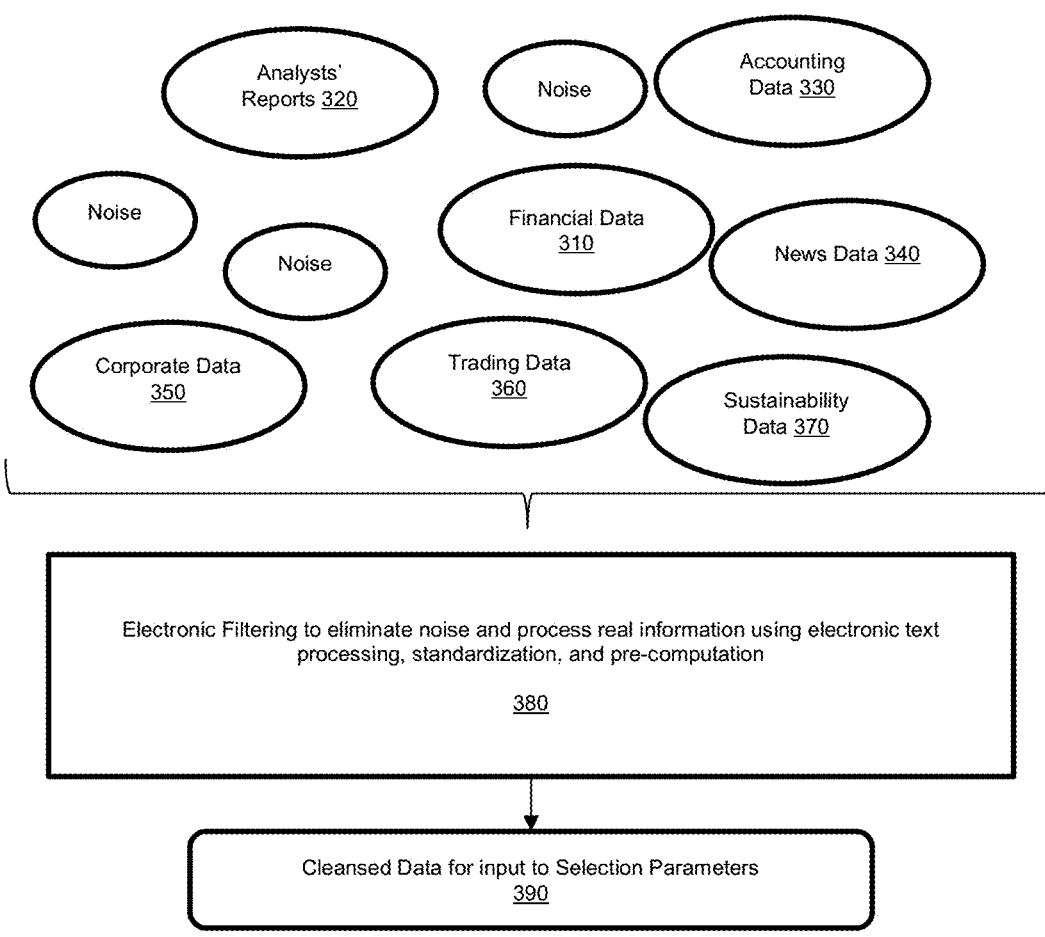
FIG. 3 schematically depicts an external data filter in the electronic processing system as shown in FIG. 1.

Turning to FIG. 3, external data electronic filter 800 is presented. Various sources of external data are optionally input to the selection parameters 100 via the external data electronic filter 800. As seen in FIG. 3, the various sources of external data associated with the financial instruments, such as financial data 310, analysts' reports 320, accounting data 330, news data 340, corporate data 350, trading data 360, and sustainability factor data 370 are interspersed with "noise" such as insignificant investment factors, advertisements or false news reports. The financial data 310 may include, but not limited to, equity price/earnings ratio, equity price/cash ratio, and dividends per equity share. The corporate data 350 may include, but not limited to, information such as nature of business, corporate structure, product and service offerings, and corporate governance. The sustainability factor data 370 may include, but not limited to, the environmental, social, and governance of a company underlying the financial instrument, and the company's adherence to the United Nation Sustainability Development Goals. Using electronic filtering 380 including text processing, standardization, and electronic pre-computation, cleansed data 390 is produced for input to selection parameters 100 (as shown in FIG. 1). The electronic filtering 380 also cleans the external data in regards to certain extraordinary corporate events such as dividend payouts and stock splits.

As seen in FIG. 4, the selection parameters 100 receives input from the financial instrument sub-database 300, the external data filter 800, the statistical volatility engine 900, the portfolio modeler 700, the investment sharing and democratisation module 1100, the deep learning decision engine 1200, factor decomposition and weighting recommendation engine 1400, and the user selection preferences 200. Operating in connection with these input are factor data 110, risk management 120, and transactions cost minimization 130 in the selector engine 500. Factor data 110 may include analysts' reports and valuations; behavioural finance may also be considered such as investors' reaction (overreaction, overconfidence) to earnings announcements as measured in market movement; momentum and reversion may also be tracked. Other valuation measures are determined in the data section such as price to earnings ratio, dividend yield, market to book, and price/cash. Alternative data such as environment, social and governance index, social media and news sentiment is also incorporated where available. The factor data module 110 of the selector engine 500 performs preliminary calculations regarding terminal/present value, annuity value, discount rate and financial instrument selection, including standardization of various financial measurements into a common currency such as US dollars or Euros.

The risk management module 120 of the selector engine 500 takes input from user preferences regarding risk (e.g., aggressive growth vs. risk-averse preservation of capital) and combines it with an analysis of market risk, trading risk, position risk, and other risk factors. Risk management also may include information generated from statistical volatility engine 900 including CAPM beta, betas with respect to other factors (e.g., geopolitical risk, energy shortage, currency devaluation, etc.), industry-adjusted betas. The risk management module 120 may optionally compute minimum and maximum size positions for contemplated financial instruments or the asset classes.

The transaction cost minimization module 130 factors in costs associated with dealing with the financial instruments in determining whether various financial instruments should be selected. The transaction cost minimization module 130 may communicate with external real-time updating electronic exchange database 3000 in obtaining or calculating fees. Such fees may include the bid-ask spread, exchange charges, broker fees, fund management fees and stock borrow fees, among others.

The above three modules: factor data module 110, risk management module 120, and transaction cost minimization module 130 are factored into the optimizer 140 to maximize portfolio value. The optimizer 140 optimizes a financial instrument distribution in order to maximize the value to the portfolio. Suppose that there are n different financial instruments. Regardless of the underlying distribution of financial instruments returns, a collection of n financial instruments returns $y_1, \ldots y_n$ has a mean of financial instruments returns:

$$m = \frac{1}{n}\sum_{n=1}^{n} y_n$$

And (sample) covariance of financial instruments returns:

$$C = \frac{1}{n-1}\sum_{n=1}^{n}(y_n - m)(y_n - m)^T$$

where C denotes the covariance matrix of rates of financial instruments return. The risk of each financial instrument i has the expected value of $u_i$. The optimizer 140 finds out what fraction $x_i$ to invest in each financial instrument i in order to maximize value, subject to various risk requirements.

In one embodiment, the optimizer 140 utilizes the classical mean-variance model, which comprises maximizing portfolio value, as measured by $$\frac{1}{2}x^T Cx$$

subject to a set of constraints. The expected risk should be no more than the maximum risk r that an investor desire, $$\sum_{i=1}^{n} u_i x_i \leq r_i$$

The sum of the investments in financial instruments fractions $x_i$ should sum to one, $$\sum_{i=1}^{n} x_i = 1$$

And, being fractions, $x_i$ should be between zero and one.

$$0 \le x_i \le 1, i = 1 \ldots n.$$

In another embodiment, the optimizer 140 optimizes a financial instrument distribution using quadratic programming that maximizes the expected value of return of a portfolio and simultaneously minimizes the risks and transaction costs.

After the optimizer section 140, the selection preferences section determines whether there should be hedged positions in section 150. As used herein, the term "hedge" relates to investment in a second financial instrument to reduce the risk of adverse price movements in a first financial instrument. Typically these are related financial instruments such as a futures contract in an underlying security in a portfolio or a short-sale of the security. In determining the effect of a hedged position, section 150 evaluates the bid-ask spread, broker fees for contracts, index futures, and/or the costs of equity borrowing.

Selection parameters 100 also takes as input from the financial instrument sub-database 300 with constraints imposed by electronic labels 400. The financial instruments sub-database may be organized by geography, industry, themes, and/or financial instrument characteristics. The electronic labels indicate whether a stock is available for portfolio construction in the optimizer according to user preferences and other factors determined from selection parameters 100. The labels are dynamically updated as new information becomes available. Selector engine 500 further receives all of the selection parameters determined in selection parameters 100 in order to compute a trade basket of financial instruments that can be executed by the execution platform 2000 to generate a dynamically-balanced portfolio 2300.

The selector engine may run various computer programs in order to determine the final trade basket. These programs may load a pre-execution portfolio and then control for trading restrictions such as stocks not to be bought/sold/traded/shorted/stocks to be liquidated. Additional risks checks for compliance, sanity, and 'fat finger' trades may be performed by selector engine 500. The selector engine 500 may also optionally standardize various financial measurements into a common currency such as US dollars or Euros. The selector engine 500 may also utilize a standardized value of data 110 as set forth below:

Standardized Value = Confidence Weight (%)*

$$\frac{[\text{Ranking of value} - (\text{Sum of number of stocks with value}) * 0.5]}{\text{Sum of number of stocks with value}}$$

After all of the various computations are made in the selector engine 500, a final trade basket is sent to selector engine output 600. The output may be sorted by regular trades and those trades for which hedging will be performed.

The regular trades include financial instruments for an optimal "long" portfolio (that is, financial instruments intended to be owned), an optimal long equities/short equities portfolio. For hedged instruments there is an optimal long equities/short futures portfolio. The selector engine output 600 may be sent to the execution platform 2000, which will communicate with the external real-time updating electronic exchange database 3000 for execution of the trades. In one embodiment, the external real-time updating electronic exchange database 3000 is a stock exchange trading platform.

Figure 7:
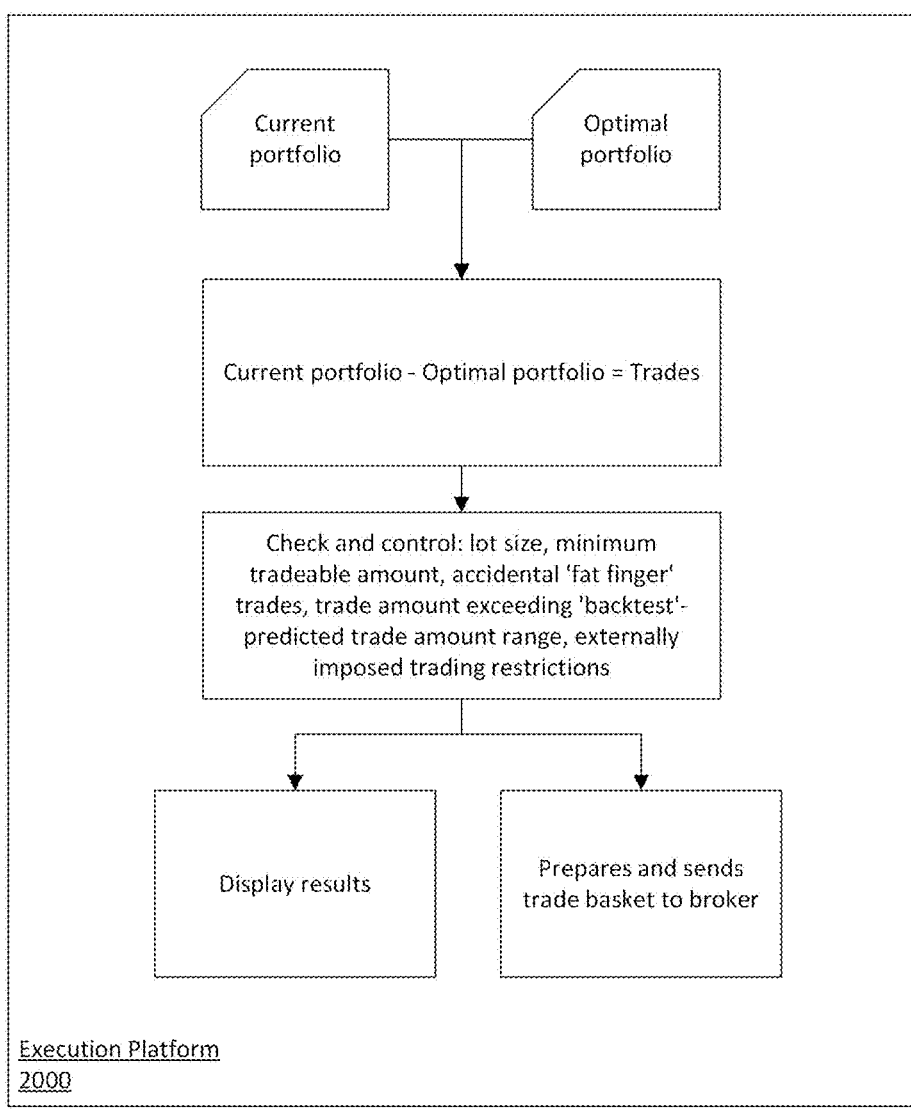
FIG. 7 schematically depicts a flow chart of the process in the execution platform in the electronic processing system as shown in FIG. 1.

FIG. 7 depicts details of the operation of the execution platform 2000. The optimal investment portfolio, optimal long equities portfolio, optimal long equities/short equities portfolio, or hedged optimal long equities/short equities portfolio received from the selector engine output 600 is first compared with the current portfolio executed. The differences are extracted and form the new trades to be executed. The new trades are finally checked against a group of parameters including lot size, minimum tradeable amount, accidental 'fat finger' trades, trade amount exceeding 'backtest'-predicted trade amount range, and externally imposed trading restrictions. The checked trades are properly data-formatted and packaged into trade orders to be sent to a broker or directly the external real-time updating electronic exchange database 3000 via an automated orders routing and placing sub-system 2500 (as shown in FIG. 1), which automatically routes and places the trade orders to brokers of a stock exchange and captures the trade order status. A trade order in non-base currency can be optionally paired with an equivalent foreign exchange order that is executed conditional upon the successful execution of the trade order. The automated orders routing and placing sub-system 2500 may be an external system. The checked trades and order status are also displayed to the user.

Figure 8:
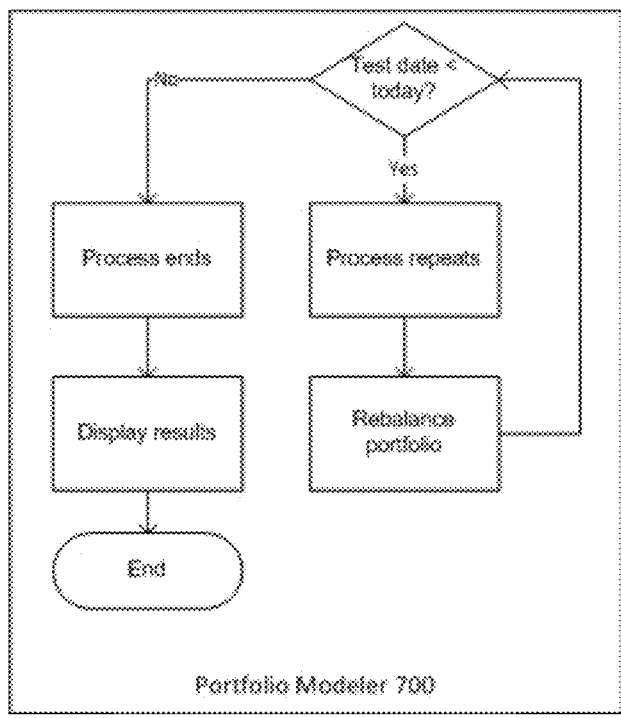
FIG. 8 schematically depicts a flow chart of the 'backtest' operation process in the portfolio modeler in the electronic processing system as shown in FIG. 1.

FIG. 8 depicts details of the 'backtest' operation of the portfolio modeler 700. The portfolio modeler 700 works to simulate the performance of an investment portfolio under various user input preferences and to determine the value and performance of that portfolio. Input from the portfolio modeler may be used as part of the input to the selection parameters 100 in assisting the financial instrument selection. One of the features of portfolio modeler 700 is that it determines the past performance of any collection of financial instruments using the same set of parameters so that a user may determine if a particular investment strategy has yielded positive returns for any specified previous period of time. Using this information, a user can determine if a particular portfolio has "out-performed" the market in the past. The portfolio modeler may employ artificial intelligence to select and model a set of financial instruments based on various user input factors. Such factors include age, initial capital to be invested, long-term and short-term investment goals, risk preferences, opinions on economic issues such as inflation, and personal principles regarding selection of particular financial instruments. The portfolio modeler may include a user interface that elicits the above information using interactive questions to which a user may input answers.

The input of user input preferences to the portfolio modeler 700 can be conducted by interactive user questioning. The user's answers to the questions. Based on the answers, the portfolio modeler 700 selects and tests the performance of a group of financial instruments, provides appropriate advice, taking his/her financial choices into account, on the allocation of the user's capital into the recommended amount per investment strategy and/or group of financial instruments. As seen in FIG. 6, an iterative process determines the portfolio value and rebalances the portfolio from a specified prior date until the present date, displaying the final performance results. The user can also iteratively enter different set of answers to the questions, thereby generating different test scenarios. In this manner, a user may iteratively test various inputs and investment preference strategies until a desired combination is determined. This information may be shared with the selection parameters 100; the user may also capture this information by updating the user preferences 200 to reflect the output of the portfolio modeler 700.

The 'backtest' operation of the portfolio modeler 700 is substantially similar to the trade execution performed by the execution platform 2000. In both, the information 'universe' is filtered with data cleansed and standardized, followed by the generation of the optimal portfolios. Instead of comparing the optimal portfolio with the currently executing portfolio and create a trade basket to be executed, the backtest operation goes into a loop. In the backtest operation, information as of that particular date is used whereas in trade execution performed by the execution platform 2000 the latest information is used. The set of parameters, equations, and optimizer are the same and kept constant in both. As such the backtest operation creates a realistic situation of what it would have been in the past.

Turning to FIG. 1 again. In one embodiment, the portfolio modeler 700 is augmented by a portfolio stress test engine 1300, which comprises at least one (a fifth) processor 1300a. The portfolio stress test engine 1300 works to introduce one or more market stress scenarios in the performance simulation of an investment portfolio and/or a 'backtest' by the portfolio modeler 700. The market stress scenarios can be modeled after historical market data recorded during one or more past market stress time periods. Portfolio stress test is performed by quantifying the 'backtest' portfolio performance over the periods of market stress. The past market stress time periods used can be user-defined or defaulted by the system. As the impetus to each market stress scenarios are unique on their own, these market stress scenarios cannot be captured by traditional risk metrics such as standard deviation of value at risk and would rely on 'backtest' results using historical data.

In another embodiment, the system further comprises a factor decomposition and weighting recommendation engine 1400. The factor decomposition and weighting recommendation engine 1400 uses actual historical price data of financial instruments to compute an optimal weighting to each of the selection parameters 100 being processed by the selector engine 500 in generating investment portfolios. This allows the user to appraise the actual performance of the investment portfolios. The weighting recommendation engine 1400 estimates the factor weightings that maximizes the Sharpe ratio based on the following:

$$\text{Max}\left(\frac{\mu^T x - r_f}{\sqrt{x^T C x}}, \text{s.t.} \sum x_i = 1, 0 \le x_i \le 1\right);$$

where $x_i$ is the weighting of the instruments in the portfolio, $\mu$ is the mean returns, $C$ is the covariance matrix of the financial instruments return, and $r_f$ is the risk-free rate. The numerator of ratio captures the excess portfolio return over the risk-free rate based on a set of weightings; whereas the denominator measures the risk/standard deviation taken on to achieve the return. In combination, the ratio is a reward to risk measure and a higher value implies a more desirable outcome.

In yet another embodiment, the system further comprises a market visualization and big data analytics engine 1500 that provides input to the selection parameters 100 in the portfolio construction engine 1000. The market visualization and big data analytics engine 1500 provides the function of supplementing traditional investment appraisal data (e.g., fundamental market data and corporate financial data) with alternative non-financial data. The market visualization and big data analytics engine 1500 is configured to continuously scan and retrieves non-financial data from traditional news sources and social media sites. The non-financial data is processed for sentiment analysis by a machine learning and natural language processing (NLP) module, which can be external to the system or an incorporated component in the market visualization and big data analytics engine 1500. The market visualization and big data analytics engine 1500 segregates non-financial data into separate information pieces and provides the sentiment analytical parametric results on each information piece. The parametric results include:

| Sentiment Analysis Result Parameter | Description |
| --- | --- |
| Industry and country averages | Assessing one's position in comparison with peers' |
| News flow | Gauging how widely distributed is the information |
| News readership | Evaluating how likely the information would have a positive or negative impact |

The market visualization and big data analytics engine 1500 may further comprise a heatmap user interface that provides a high-level view display at a single glance of a variable. This allows a user to quickly digest the information and then drill into a specific area. Drilling deeper into that specific area identifies to the user the associated financial instruments. Possible variables that allow top-down drill are: country, industry, company financial data (e.g., P/E, dividend yield), equity price performance, sentiment, etc.

The execution platform 2000 includes a selection limiter 2100 that sets limits in a trade based on electronic flags 2200 computed from electronic checks relating to the amount and type of the trades. Selected financial instruments are input to a dynamically-balanced portfolio 2300 which is updated according to user specifications at any given frequency.

In one embodiment, the system further comprises a portfolio monitoring engine 2400, which comprises at least one (a sixth) processor 2400a and configured to interact with the execution platform 2000. The portfolio monitoring engine 2400 processes the trade data being handled by the execution platform 2000 in executing the trades. The portfolio monitoring engine 2400 enables users to maximise payoff whilst limiting the downside. To achieve this, the portfolio monitoring engine 2400 provides the facility (e.g., via a user interface) for a user to pre-programme her desired stop losses and take profits levels. To maximise profits, the system holds on continuously to a long position of a specific financial instrument until its market price is moved above the user-defined take profits level price by which an order will automatically be placed so that the user can take advantage of sudden or unexpected changes in financial instrument prices. To limit the downside, the user specifies a limit on the maximum possible losses, without setting a limit on the maximum possible gain. The engine continuously recalculates the stop losses sell-trigger price and limit sell price at some points below the market price based on the user-defined amount of maximum possible losses. As the market price rises, both the stop losses sell-trigger price and the limit sell price rise proportionally, but if the stock price falls, the stop losses sell-trigger price remains unchanged, and when the stop losses sell-trigger price is reached, a limit sell order is submitted at the last calculated stop losses limit sell price. The engine is further enhanced by a mechanism to prevent accidental shorting of an instrument in highly volatile market when stop losses order (at a lower price) and take profits order (at a higher price) are placed simultaneously. For example, to avoid accidentally short-selling, when a stop loss order is executed, the corresponding take profit order is cancelled. If a stop loss order is partially executed, the remaining order in the corresponding take profit is reduced proportionately by the amount that was executed. If a cut loss order is cancelled before execution, the corresponding take profits order is cancelled. The reverse is true in the case of take profit order being executed partially, completely or cancelled.

In another embodiment, the system further comprises a portfolio yield enhancement engine 2600 that interacts with the execution platform 2000. The portfolio yield enhancement engine 2600 processes the trade data being handled by the execution platform 2000 in executing the trades. The portfolio yield enhancement engine 2600 is designed to specifically handle certain buy-and-hold ('long position') financial instruments or equities in a portfolio that regularly generates cashflows such as dividends and interests. The portfolio yield enhancement engine 2600 works to enhance these cashflows by writing covered call options against the underlying financial instruments' long positions, that is the underlying financial instruments are to be sold if and when a user-defined pre-determined price (higher than the present price) is reached in a future point of time before the expiration of the call option. The additional cashflow generated by the portfolio yield enhancement engine 2600 is the option premium paid for by the call option buyer.

In one embodiment, the system further comprises a deep learning decision engine 1200. The deep learning decision engine 1200 operates to augment the financial instrument selection in creating the investment portfolio. For example, the deep learning decision engine 1200 can be trained to improve decision making for factor weights in investment selection by overweighting one factor versus another in the selector parameters 100. This leads to a different portfolio being optimized from the selector engine 500—one that has better predictive power of future returns by the investment factors.

In one embodiment, the deep learning decision engine 1200 employs one or more of deep leaning methods including: a nonlinear autoregressive recurrent neural network (NARX) with exogenous inputs model; and a long short-term memory (LSTM) neural network.

The NARX network is configured to learn and to predict a one time series given as inputs the past values of the same time series, the feedback input, and another time series. The NARX model can be characterized by:

$$y(t) = f(y(t-1), y(t-2), \ldots, y(t-n_y), u(t-1), u(t-2), \ldots, u(t-n_u));$$

where the next value of a dependent output, y(t), is regressed on previous values of the output and previous values of an independent exogenous input, u(t). The NARX network is a feedforward neural network approximating the function $f$. The output, y(t), is estimated in a nonlinear dynamic system that the NARX network is being trained to model. The final output, y(t), is then taken as an estimated output of the combination of selection parameter weights that enters the selector engine 500 as input. The exogenous input, u(t) can be other micro financial variables and/or macro financial market data.

Figures 9A, 9B:
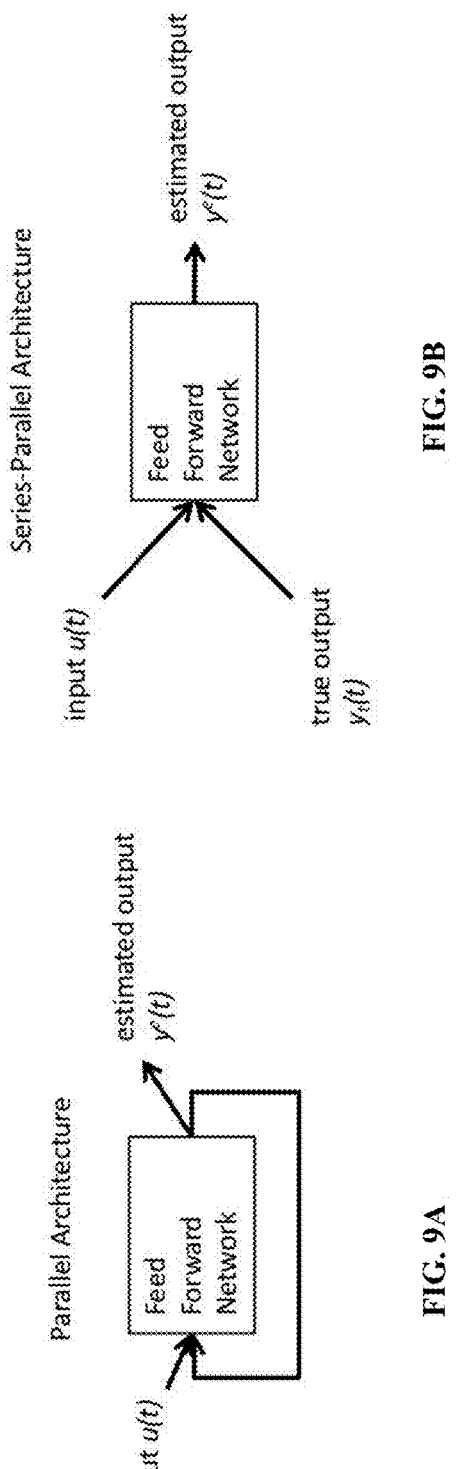
FIG. 9A schematically depicts a logical architecture of a feedforward neural network having a parallel architecture.
FIG. 9B schematically depicts a logical architecture of a feedforward nonlinear autoregressive recurrent neural network (NARX) having a serial-parallel architecture in accordance to one embodiment of the present invention.

Examples of micro financial variables include technical signals (e.g. relative strength index), analysts forecasts (e.g. recommendations), company performance (e.g. earnings growth); and examples of macro financial market data include foreign currency exchange and the U.S. Dollar index. The output of the NARX network is fed back to the input of the feedforward neural network as part of a standard NARX architecture (the parallel architecture as shown in FIG. 9A). Since the true output, y(t), is available during the training of the NARX network, the true output, y(t), instead of the estimated output, $y^e(t)$, is used in the feedback as shown in series-parallel architecture depicted in FIG. 7B. The advantages of the series-parallel architecture are that the input to the NARX network is more accurate, the resulting NARX network has a purely feedforward architecture, and static backpropagation can be used for training in the series-parallel architecture (as shown in FIG. 9B). The series-parallel architecture may be used in the training of the NARX network and the parallel architecture may be used for multi-step-ahead prediction. During training, the number of neurons in the hidden layer is set, and the weight and bias values are set according to the Levenberg-Marquardt optimization (details are disclosed in Hagan, M. T. and M. Menhaj, "Training feed-forward networks with the Marquardt algorithm," *IEEE Transactions on Neural Networks*, Vol. 5, No. 6, 1999, pp. 989-993, 1994; and in https://en.wikipedia.org/wiki/Levenberg-Marquardt_algorithm; disclosure of which is incorporated herein by reference in its entity).

In one embodiment of the present invention, an NARX is employed in the estimation of factor weights (in selection parameters 100) for momentums. In this case, part of the dataset is adopted for training the NARX model on y(t) where y(t) is the ideal factor weights for momentums that maximize the investment portfolio value. During training, y(t) is estimated based on the ideal actual factor weights of the past, y(t−n); and other contemporaneous variables such as volume of trade and rate of price change. Using the trained model, the NARX would forecast y (t) that would maximize portfolio value in the selector engine 500.

Figure 10A:
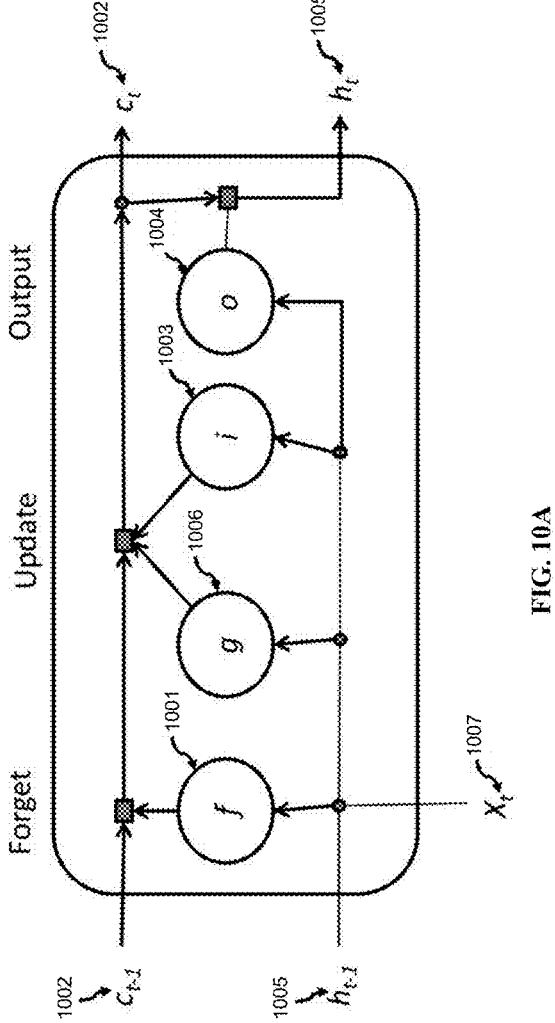
FIG. 10A schematically depicts a logical architecture of a long short-term memory model (LSTM) block in accordance to one embodiment of the present invention.

The LSTM is a type of recurrent neural network (RNN). Training an RNN is usually done by backpropagation through time. The sequence-to-sequence LSTM network is trained for time series forecasting where the actual values are the training sequences with the values shifted by one time-step. That is, at each time step of the input sequence, the LSTM network learns to predict the value of the next time-step. FIG. 10A depicts the architecture of an LSTM block. Similar to that of a traditional RNN, an LSTM block typically has a cell candidate 1002, input gate 1003, output gate 1004, a forget gate 1001, a hidden state 1005, an update gate 1006, and an input 1007. LSTM network is less sensitive to having gaps in the time series data. So, if a time series is incomplete, the LSTM network is better at the analysis of sequential data than traditional RNNs. The weights and biases to the input gate 1003 control the extent to which a new value flows into the cell. Similarly, the weights and biases to the forget gate 1001 and output gate

1004 control the extent to which a value remains in the cell and the extent to which the value in the cell is used to compute the output activation of the LSTM block respectively.

Figure 10B:
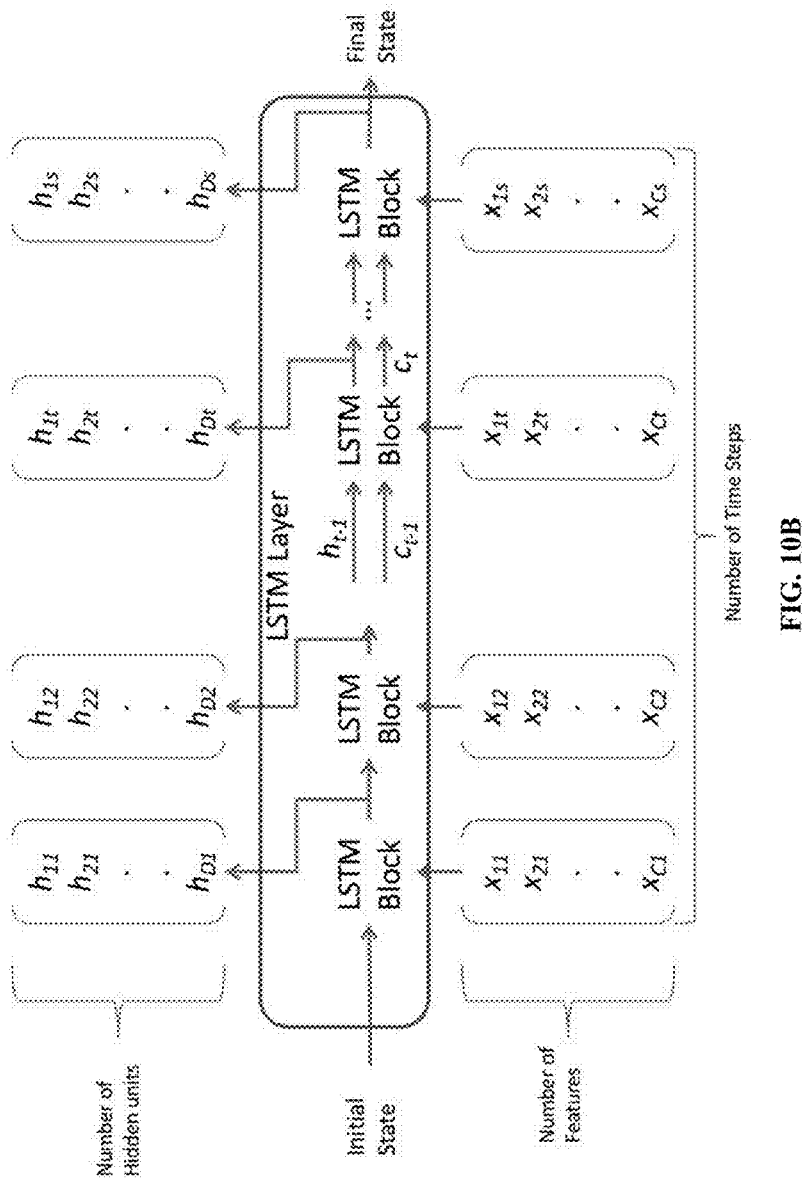
FIG. 10B schematically depicts a logical architecture of the LSTM layer in accordance to one embodiment of the present invention.

Referring to FIG. 10B. In accordance to one embodiment of the LSTM, a time series factor weight estimation is applied to an LSTM layer, wherein a time series x with C features (channels) of s number of time steps is flown through the LSTM layer. The states of the LSTM layer comprise a hidden state (also known as output state), $h_t$, and a cell state $c_t$. The first LSTM block uses the initial state of the LSTM layer and a first time-step of the sequence to compute a first output and an updated cell state. At time step t, the block uses the current states of the LSTM layer ($c_{t-1}$, $h_{t-1}$) and the next time step of the sequence to compute the updated hidden state $h_t$ and the updated cell state $c_t$. The hidden state at time step t, $h_t$, contains the output of the LSTM layer for this time step.

The cell state $c_t$ contains information learned from the previous time steps. At each time step, the layer adds information to or removes information from the cell state $c_t$. The LSTM layer controls these information additions and removals using the forget gates 1001, the cell candidates 1002, the input gates 1003, and the output gates 1004. These components control the cell state and hidden state of the LSTM layer through the flow of data at time step t. The learnable weights of these components comprise input weights W, recurrent weights R, and a bias b such that:

$$W = \begin{bmatrix} W_i \\ W_f \\ W_g \\ W_o \end{bmatrix}; R = \begin{bmatrix} R_i \\ R_f \\ R_g \\ R_o \end{bmatrix}; \text{ and } b = \begin{bmatrix} b_i \\ b_f \\ b_g \\ b_o \end{bmatrix};$$

where i denotes the input gate; f denotes the forget gate; g denotes the cell candidate; and o denotes the output gate. The cell state at time step t, $c_t$, is given by:

$$c_t = f_t \odot c_{t-1} + i_t \odot g_t;$$

where $\odot$ denotes the elementwise multiplication of vectors. The hidden state at time step t, $h_t$, is given by:

$$h_t = o_t \odot \sigma_c(c_t);$$

where $\sigma_c$ denotes the state activation function and it is computed using the hyperbolic tangent (tan h) function. The components of the LSTM layer can then be described:

| Component | Function | Equation |
|---|---|---|
| Input gate i | Control the level of cell state update | $i_t = \sigma_g(W_i x_t + R_i h_{t-1} + b_i)$ |
| Forget gate f | Control the level of cell state reset (forget) | $f_t = \sigma_g(W_f x_t + R_f h_{t-1} + b_f)$ |
| Cell candidate g | Add information to the cell state | $g_t = \sigma_c(W_g x_t + R_g h_{t-1} + b_g)$ |
| Output gate o | Control the level of cell state added to the hidden state | $o_t = \sigma_g(W_o x_t + R_o h_{t-1} + b_o)$ | where $\sigma_g$ denotes the gate activation function, computed using the sigmoid function given by:

$$\sigma_g = (1 + e^{-x})^{-1};$$

Additional details are available from Hochreiter, S., and J. Schmidhuber. "Long short-term memory." *Neural computation*, Vol. 9, No. 8, pp. 1735-1780, 1997; the disclosure of which is incorporated herein by reference in its entirety. As an example, the number of analysts' forecast revisions can be forecasted by using a LSTM network where the data is a time series of analyst forecast revision. The procedure includes splitting the data for training and testing, standardizing the data to have zero mean and unit variance, then specifying the number of revisions to be the training sequences with values shifted by one time-step. That is, at each time step of the input sequence, the LSTM network learns to predict the value of the next time-step. The predictors are the training sequences without the final time-step. In this example, the LSTM is specified to have 200 hidden units.

In another embodiment of the present invention, an Explainable artificial intelligence (AI) module, which comprises at least one (a seventh) processor, is employed by the system to explain a deviation between an actual return and a mean predicted return, and a deviation between a predicted return at any point in time and the mean predicted return of an investment portfolio under the various afore-described inputs to the selection parameters 100. In yet another embodiment, the Explainable AI is employed to explain a deviation between an actual revenue and a mean predicted revenue, and a deviation between a predicted revenue at any point in time and the mean predicted revenue of licensing fees generated from a licensable investment portfolio or strategy under the various afore-described marketing factors, which include at least number of leads, expenditure on the leads, and number of influencers promoting the investment portfolio or strategy.

The Explainable AI module adopts the Shapley value framework, which is built upon cooperative game theory and focus on local explanation that is model agnostic. The Shapley value of a feature for a query point explains the contribution of the feature to a prediction (response for regression or score of each class for classification) at the specified query point. The Shapley value corresponds to the deviation of the prediction for the query point from the average prediction, due to the feature. For each query point, the sum of the Shapley values for all features corresponds to the total deviation of the prediction from the average. The Shapley value of the $i^{th}$ feature for the query point x is defined by the value function v:

$$\varphi_i(v_x) = \frac{1}{M} \sum_{S \subseteq \mathcal{M} \setminus \{i\}} \frac{v_x(S \cup \{i\}) - v_x(S)}{\frac{(M-1)!}{|S|!(M-|S|-1)!}}; \qquad (1)$$

where M is the number of all features; $\mathcal{M}$ is the set of all features; |S| is the cardinality of the set S, or the number of elements in the set S; and $v_x(S)$ is the value function of the features in a set S for the query point x. The value of the function indicates the expected contribution of the features in S to the prediction for the query point x. For each query point, the sum of the Shapley values for all features corresponds to the total deviation of the prediction from the average.

$$\sum_{I=1}^{M} \varphi_i(v_x) = f(x) - E[f(x)]. \qquad (2)$$

Therefore, the value function $v_x(S)$ must correspond to the expected contribution of the features in S to the prediction (f) for the query point x. Under the Shapley value framework, $v_x(S)$ is computed using the KernelSHAP algorithm, which defines the value function of the features in S at the query point x as the expected prediction with respect to the interventional distribution D, which is the joint distribution of the features in Sc:

$$v_x(S) = E_D[f(x_S, X_{Sc})]; \qquad (3)$$

where $x_s$ is the query point value for the features in S, and $X_{Sc}$ are the features in Sc. To evaluate the value function $v_x(S)$ at the query point x, with the assumption that the features are not highly correlated, Shapley uses the values in the data X as samples of the interventional distribution D for the features in Sc:

$$v_x(S) = E_D[f(x_S, X_{Sc})] \approx \frac{1}{N}\sum_{j=1}^{N}[f(x_S, X_{Sc})]; \qquad (4)$$

where N is the number of observations, and $(X_{Sc})_j$ contains the values of the features in Sc for the $j^{th}$ observation. By using equation 2 above, the Shapley value framework explains the predicted returns of a financial instrument, an investment portfolio, or a strategy at any point in time vs. the mean prediction in terms of the contributions by the investment factors (e.g., financial, sustainability, and others). Also, by dividing equation 2 with the actual value, the Shapley value framework explains the deviation of the mean prediction vs. the actual by the contributions by the different factors.

In another embodiment, the deep learning decision engine 1200 employs a reinforcement learning model designed specifically for short term trading situations, where returns on investment are purely in capital gains or losses. The reinforcement learning model is trained in placing multiple bids and asks at different levels (market making policy) to maximize expected gains whilst minimizing inventory risks caused by i.e., asset devaluation. The reinforcement learning model is based on a Deep Q-Network (DQN), and the DQN relies on a Q-function where every action taken at one specific state following a policy $\pi$ has an expected value $Q^\pi$ (s, a), which can be expressed as:

$$Q^\pi(s, a) = E\left[\sum_{k=0}^{\infty}\gamma^j r_{t+k}\|s_t = s, a_t = a, \pi\right]; \qquad (5)$$

where $\gamma$ is a discount factor. Details on the DQN are provided in Vicente et al., "Automated market maker inventory management with deep reinforcement learning," *Applied Intelligence*, 53:22249-2266, 2023; the disclosure of which is incorporated herein by reference in its entirety.

The advantage of the employment of the reinforcement learning model by the deep learning decision engine 1200 over existing techniques is that the market making policy is not based on pure mathematical techniques that often set a static penalty for inventory and tends to reduce final returns; but rather is based on a machine learning technique and adopts dynamic penalty for inventory to enable profitable strategies.

In another embodiment, the deep learning decision engine 1200 employs a Heirarchical Risk Parity (HRP) model for organizing "similar" financial instruments in an investment portfolio into clusters. The organizing process is recursive process that continuously subdivides each cluster into smaller clusters until the individual financial instrument is reached, defining a hierarchy tree. Each cluster then contain financial instruments that are "similar". "Similarity" is defined by the correlations between financial instruments, the higher the correlation means the higher the similarity. Further, a distance can be defined between a pair of financial instruments in relation to their correlation. Perfectly correlated financial instruments have the minimum distance of 0 while the most uncorrelated or negatively correlated financial instruments have a distance close to 1.

Figure 11:
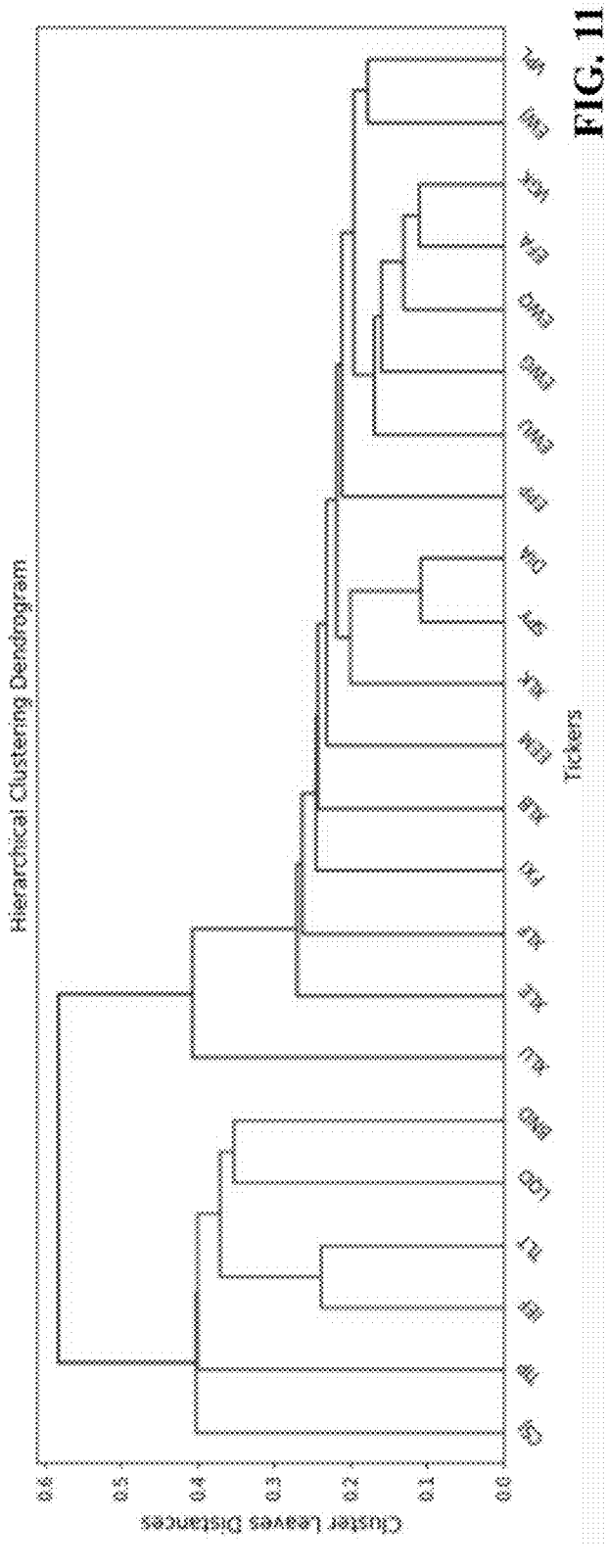
FIG. 11 illustrates an exemplary hierarchical clustering dendrogram.

The organizing process starts with a hierarchical tree clustering comprising segregating the financial instruments in an investment portfolio into clusters that mimic the real-life interactions between the financial instruments—some financial instruments are related to each other more than others and hence can be grouped within the same cluster. The result is a logical tree structure of hierarchical clusters. Such a logical tree structure can be visualized as a hierarchical clustering dendrogram as illustrated in FIG. 11.

The organizing process further proceeds to a matrix seriation for rearranging the hierarchical clusters to more clearly show the inherencies among the clusters. Using the order of the hierarchical clusters, rows and columns of a covariance matrix of the financial instruments are re-arranged so that similar financial instruments are placed together, and dissimilar financial instruments are placed far apart. The result is a map of clustered correlations among the financial instruments as illustrated in FIG. 12.

Lastly, the organizing process proceeds to a recursive bisection operation in which weights are assigned to the financial instruments in a top-down recursive manner. Based on the logical tree structure, the weights trickle down the tree and get assigned to the individual financial instruments. All of the weights are initialized with the same value for all of the financial instruments. Then, the logical tree structure is explored from top to bottom and every time it is branched into two hierarchical clusters, they compete for the weights. That is, an individual volatility is computed for each one of the hierarchical clusters and their weights are updated in a manner inversely proportional to the volatilities. We compute these volatilities are computed with consideration for a diagonal correlation matrix in which the inverse-variance allocations are optimal.

In another embodiment, the deep learning decision engine 1200 employs a Multi-layer Perceptron (MLP) model. Details of the MLP model are provided in Chan et al., "Deep neural networks in the cloud: Review, applications, challenges and research directions," *Neurocomputing*, 545 (2023) 126327, 2023; the disclosure of which is incorporated herein by reference in its entirety.

In yet another embodiment, the deep learning decision engine 1200 employs a Residual Neural Network (ResNet). The ResNet is a type of deep learning neural network having building blocks that have residual connections (also known as "skip" or shortcut connections). These connections allow the input to skip the convolutional units of the main branch, thus providing a simpler path through the network. By allowing the parameter gradients to flow more easily from the final layers to the earlier layers of the network, residual connections help mitigate the problem of vanishing gradients during early training. The structure of the ResNet is flexible. The key component is the inclusion of the residual connections within residual blocks. A group of residual blocks is called a "stack". The ResNet architecture comprises initial layers, followed by stacks containing residual blocks, and then the final layers.

The ResNet has three types of residual blocks:

Initial residual block—this block occurs at the start of the first stack. The layers in the residual connection of the initial residual block determine if the block preserves the activation sizes or performs downsampling.

Standard residual block—This block occurs multiple times in each stack, after the first downsampling residual block. The standard residual block preserves the activation sizes.

Downsampling residual block—This block occurs once, at the start of each stack. The first convolutional unit in the downsampling block downsamples the spatial dimensions by a factor of two.

Whilst investing sustainably is impactful and purposeful, many investors cannot afford to compromise returns especially if they have fiduciary responsibilities (e.g., a pension fund) or are required to make investment decisions solely based on pecuniary factors. In one embodiment of the present invention, a sustainable investing module, which comprises at least one (an eighth) processor, is employed by the system to optimize the investment portfolios in terms of sustainability and returns on investments while minimize transaction costs and risks.

The sustainable investing module adopts quadratic programming with sustainability being the alpha in optimizing an investment portfolio. The quadratic programming essentially maximizes a function incorporating sustainability, which can be represented by the following equations (6) to (8), but subject to the constraints, which can be represented by the following equations (9) to (13).

$$\Theta(w_1 + x_1) \cdot \propto_1 + \ldots \Theta(w_n + x_n) \cdot \propto_n; \quad (6)$$

for capturing the expected value of the investment portfolio, weighted by sustainability alpha factors and confidences in the sustainability alpha factors;

$$-\gamma \cdot tc_1 \cdot |x_1| - \ldots - \gamma \cdot tc_n \cdot |x_n|; \quad (7)$$

for deducting the transaction costs of trades, scaled by an importance scale representing the current market's level of trading friction and participation level;

$$-\mu[(w_1 + x_1)^2 + \ldots (w_1 + x_1)^2]; \quad (8)$$

for deducting the squared values of the positions to prevent the optimal investment portfolio from exploding in size;

$$|w_1 + x_1| \le \text{Maximum Position}_1; \text{ and} \quad (9)$$

$$|w_n + x_n| \le \text{Maximum Position}_n;$$

Constraint 1: the individual financial instrument position must be less than or equal to its maximum;

$$|x_1| \le \text{Maximum Trade}_1; \text{ and} \quad (10)$$

$$|x_n| \le \text{Maximum Trade}_n;$$

Constraint 2: the individual trades to get to the optimal financial instrument positions must be less than or equal to the maximum;

$$\sum^p |w_i + x_i| \le \text{Maximum Exposure To Limit}_p; \quad (11)$$

Constraint 3: the total exposure of the financial instrument position must be less than or equal to the limit (e.g., industry, sector, country, or risk factor);

$$\beta_1(w_1 + x_1) + \ldots \beta_n(w_n + x_n) = \text{Portfolio Target Beta}; \quad (12)$$

Constraint 4: the investment portfolio's beta must be equal to the target beta, which is zero for market neutral strategies;

$$(w_1 + x_1) + \ldots (w_n + x_n) = \text{Portfolio Target Delta}; \quad (13)$$

Constraint 4: the investment portfolio's delta (the equity position size) must be equal to the target delta, which is zero for market neutral strategies;

where:

$\Theta$: sustainability alpha signal strength scaled, which captures the confidence of the sustainability alpha signals;

$w_1 \ldots w_n$: the initial positions of financial instruments 1 to n in the investment portfolio;

$x_1 \ldots x_n$: the trades that we seek in equities 1 to n to get to the optimal investment portfolio;

$\propto_1 \ldots \propto_n$: the standardised sustainability alpha signals in financial instruments 1 to n that we seek to maximise in the optimal investment portfolio;

$\gamma$: transaction costs scale, which controls the importance of transaction costs in the optimization; and $tc_1 \ldots tc_n$: the transaction costs associated with trading financial instruments 1 to n $\mu$: booksize scale, which controls the strictness of the optimiser in adhering to the specified booksize.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A system for autonomously creating one or more investment portfolios of selected financial instruments, sharing the investment portfolios, and executing trade instructions thereof, comprising:

a selector engine comprising a first computer processor configured for:

creating selection parameters used in selections of financial instruments according to a statistical model representing selection desirability of financial instruments combined with entered user selection preferences for the selections of financial instruments;

creating the one or more investment portfolios of financial instruments selected based on the selection parameters, a factor weight to each of the selection parameters, and a weighting of each of the financial instruments selected in each of the investment portfolios; and converting the investment portfolios data to output data representing the trade instructions of financial instruments;

wherein input to the selector engine for setting the selection parameters created comprising one or more of financial data, analysts' reports, accounting data, news data, corporate data, trading data, and sustainability factor data;

an execution platform comprising a second computer processor configured for receiving the output data of the selector engine and autonomously executing the trade instructions represented by the output data;

an investment sharing and democratization module comprising a third computer processor configured for:

accessing one or more invention portfolio data of other users of the system to generate a specified target investment portfolio adjustable by a degree of imitation of the one or more invention portfolio data of the other users; and generating from the specified target investment portfolio an additional input to the selector engine for setting the selection parameters;

a sustainable investing module comprising an eighth computer processor configured to provide the sustainability factor data as input to the selector engine for setting the selection parameters so to optimize the investment portfolios in terms of sustainability and returns on investment while minimize transaction costs and risks; and a deep learning decision engine configured to optimize the investment portfolios by estimating one or more of the factor weights to the selection parameters and the weightings of the financial instruments selected for the investment portfolios;

wherein the deep learning decision engine comprises a Heirarchical Risk Parity (HRP) model employed in the estimation of the weightings of the financial instruments selected for the investment portfolios.

2. The system of claim 1, wherein the HRP model is trained to:

organize the financial instruments selected in each of the investment portfolios into a plurality of hierarchical clusters arranged in a logical tree structure according to similarity among the financial instruments such that the hierarchical clusters logically mimic real-life interactions between the financial instruments and that similar financial instruments are placed close to each other and dissimilar financial instruments are placed far apart;

compute a volatility for each of the hierarchical clusters; and estimate one or more of the weightings of the financial instruments selected based on the volatility of each of the hierarchical clusters under a recursive bisection operation in which weights are assigned in a top-down recursive manner following the logical tree structure.

3. The system of claim 1, wherein the deep learning decision engine is configured to employ a nonlinear autoregressive recurrent neural network (NARX);

wherein the NARX is trained to estimate one or more of the factor weights to the selection parameters using past estimated factor weights and other contemporaneous variables including trade volumes and rates of price change of financial instruments.

4. The system of claim 1, wherein the deep learning decision engine is configured to employ a long short-term memory (LSTM) neural network;

wherein the LSTM is trained to estimate one or more of the factor weights to the selection parameters using previous time steps in a time series of sequence of the factor weights.

5. The system of claim 1, further comprising:

a leads tracking, ideas passporting and revenue split module comprising a fourth computer processor configured for:

tracking leads including one or more of targeted electronic communications, online advertisements, social media postings, and click-throughs thereof promoting a investment portfolio allowed to be licensed;

tracking licensing activities of the investment portfolio allowed to be licensed;

passporting the investment portfolio allowed to be licensed to a licensee entity;

determining a portion of a licensing fee generated from the investment portfolio allowed to be licensed according to a contributor ratio.

6. The system of claim 1, further comprising:

a portfolio modeler comprising a fifth computer processor configured for executing a performance simulation of one of the investment portfolios; and a portfolio stress test engine comprising a sixth computer processor configured for introducing one or more market stress scenarios in the performance simulation of the investment portfolio by the portfolio modeler.

7. The system of claim 1, further comprising a portfolio monitoring engine comprising a seventh computer processor configured for:

continuously monitoring market prices of one or more financial instruments in the one or more investment portfolios;

generating a take profit trade order signaling a sale of a financial instrument having market price reaching at or above a defined take profits level price;

continuously calculating a stop losses sell-trigger price and a stop losses limit sell price of a financial instrument, wherein the stop losses sell-trigger price and the stop losses limit sell price move in proportion with a rising market price of the financial instrument, and wherein the stop losses sell-trigger price and the stop losses limit sell price remain unchanged with a falling market price of the financial instrument; and generating a stop losses trade order signaling a sale of a financial instrument having market price reaching at or below stop losses sell-trigger price;

wherein the portfolio monitoring engine prevents accidentally short-selling a financial instrument due to volatile market when both take profits level price and stop losses limit sell price are set;

wherein when either the take profit trade order or stop losses trade order on a financial instrument is fully executed, any remaining pending trade order on the financial instrument is canceled;

wherein when either the take profit trade order or stop losses trade order on a financial instrument is partially executed, any remaining pending trade order on the financial instrument is reduced proportionately by the partially executed amount; and wherein when either the take profit trade order or stop losses trade order on a financial instrument is canceled before execution, any remaining pending trade order on the financial instrument is canceled.

8. The system of claim 1, further comprising an Explainable Artificial Intelligence module configured for:

explaining a first deviation between an actual return and a mean predicted return of each of the investment portfolios; and explaining a second deviation between a predicted return at any point in time and the mean predicted return of each of the investment portfolios.

9. The system of claim 1, wherein the investment sharing and democratization module is further configured for:

matching and suggesting investment portfolios and strategies to users;

allowing an investment portfolio of a creator to be licensed by one or more licensees, and followed by one or more followers;

propagating changes in the investment portfolio allowed to be licensed made subsequently by the creator to its followers;

allowing referral by an influencer the investment portfolio allowed to be licensed to followers;

tracking each of the users' contributions to fees generated;

computing rewards for the users;

reconciling and splitting the fees generated to the users who contributed to the fees generated according to an agreed ratio.

10. The system of claim 9, further comprising an Explainable Artificial Intelligence module configured for:

explaining a first deviation between an actual revenue and a mean predicted revenue of licensing fees generated from an investment portfolio allowed to be licensed; and explaining a second deviation between a predicted revenue at any point in time and the mean predicted revenue of licensing fees generated from the investment portfolio allowed to be licensed.

* * * * *